United States Patent [19]

Kao et al.

[11] Patent Number: 4,871,006

[45] Date of Patent: Oct. 3, 1989

[54] DUAL FLUTED SHADE

[76] Inventors: Jamee Kao, 2400 S. Whitehall Dr., #2060, Mundelein, Ill. 60060; Joseph Hsu, 35 Lane 46, Chung-Shan N. Rd., Sec. 5, Taipei, Taiwan, 111

[21] Appl. No.: 145,369

[22] Filed: Jan. 19, 1988

[51] Int. Cl.[4] ............................ A47H 5/00; B32B 3/12

[52] U.S. Cl. .................................. 160/84.1; 156/205; 428/12; 428/116; 428/181; 428/188

[58] Field of Search ................. 428/116, 188, 12, 181; 160/84.1; 156/197, 205; 362/352, 360

[56] References Cited

U.S. PATENT DOCUMENTS

| | | | |
|---|---|---|---|
| 1,284,771 | 11/1918 | Quinn | 425/369 |
| 1,603,465 | 10/1926 | Hopkinson | 156/65 |
| 2,874,612 | 2/1959 | Luboshez | 160/84.1 X |
| 3,157,551 | 11/1964 | Granozio | 425/370 X |
| 3,294,605 | 12/1966 | Fischer | 156/65 |
| 3,547,751 | 12/1970 | Morgan | 428/116 X |
| 3,963,549 | 6/1976 | Rasmussen | 156/193 |
| 4,132,577 | 1/1979 | Wintermantel | 428/188 X |
| 4,673,600 | 6/1987 | Anderson | 428/116 X |
| 4,677,013 | 6/1987 | Anderson | 428/116 |
| 4,685,986 | 8/1987 | Anderson | 156/197 |

FOREIGN PATENT DOCUMENTS 2840023 3/1980 Fed. Rep. of Germany .

*Primary Examiner*—Michael W. Ball
*Assistant Examiner*—David Herb

[57] ABSTRACT

A dual fluted shade consisting of two parallel one-piece webs of material with deep adjacent arcuate flutes directly connected with parallel connecting strips.

2 Claims, 2 Drawing Sheets

DUAL FLUTED SHADE

BACKGROUND OF THE INVENTION

Expandable honeycomb structures have been used for many years as window coverings and are in some cases constructed of two separate pleated materials which are secured together either with or without additional materials so they define a plurality of longitudinally extending tubes or cells, one on top of the other. In the retracted state of the honeycomb structure, the adjacent cells are collapsed on each other. An example of such an expandable honeycomb structure is shown in the Anderson U.S. Pat. No. 4,685,986. Anderson forms the honeycomb structure by feeding previously pleated first and second sheets in opposite directions toward a pressure member. As the pleats approach the pressure member, one side of each pleat is covered with an adhesive and thereafter adjacent pleats in the first and second previously pleated sheets are pressed by the pressure member against two reciprocating folding knives and the resulting honeycomb structure is fed in a direction perpendicular to the direction of travel of the first and second pleated sheets.

While the Anderson method produces a satisfactory honeycomb structure it nevertheless is quite costly because it requires the use of previously pleated material.

The Anderson, U.S. Pat. No. 4,673,600 shows in its FIGS. 3 and 6 embodiment, an accordion pleated honeycomb window covering that is formed by two accordion pleated webs connected by a plurality of strips. The accordion pleating construction, however, results in a plurality of flat planar exterior surfaces, each of which deflects light only in a single direction and hence does not optimize the insulating characteristics of the wall covering.

It is a primary object of the present invention to ameliorate the problems noted above in pleated window shades.

SUMMARY OF THE PRESENT INVENTION

In accordance with the present invention, a superior insulating dual fluted shape is provided that consists of two parallel one-piece webs of material each with deep adjacent arcuate flutes connected to one another directly by parallel strips without any intermediate layers of material.

The large radius deep arcuate flutes act to direct light in an infinite number of directions over an arc of substantially 180 degrees around each flute. This provides a far greater insulating characteristic for the resulting composite shade over heretofore known accordion pleated flutes that have flat planar walls that direct and deflect light in only a single direction.

Other objects and advantages of the present invention will appear more clearly in the following detailed description.

DETAILED DESCRIPTION OF THE PREFERRED EMBODIMENT

Figure 1:
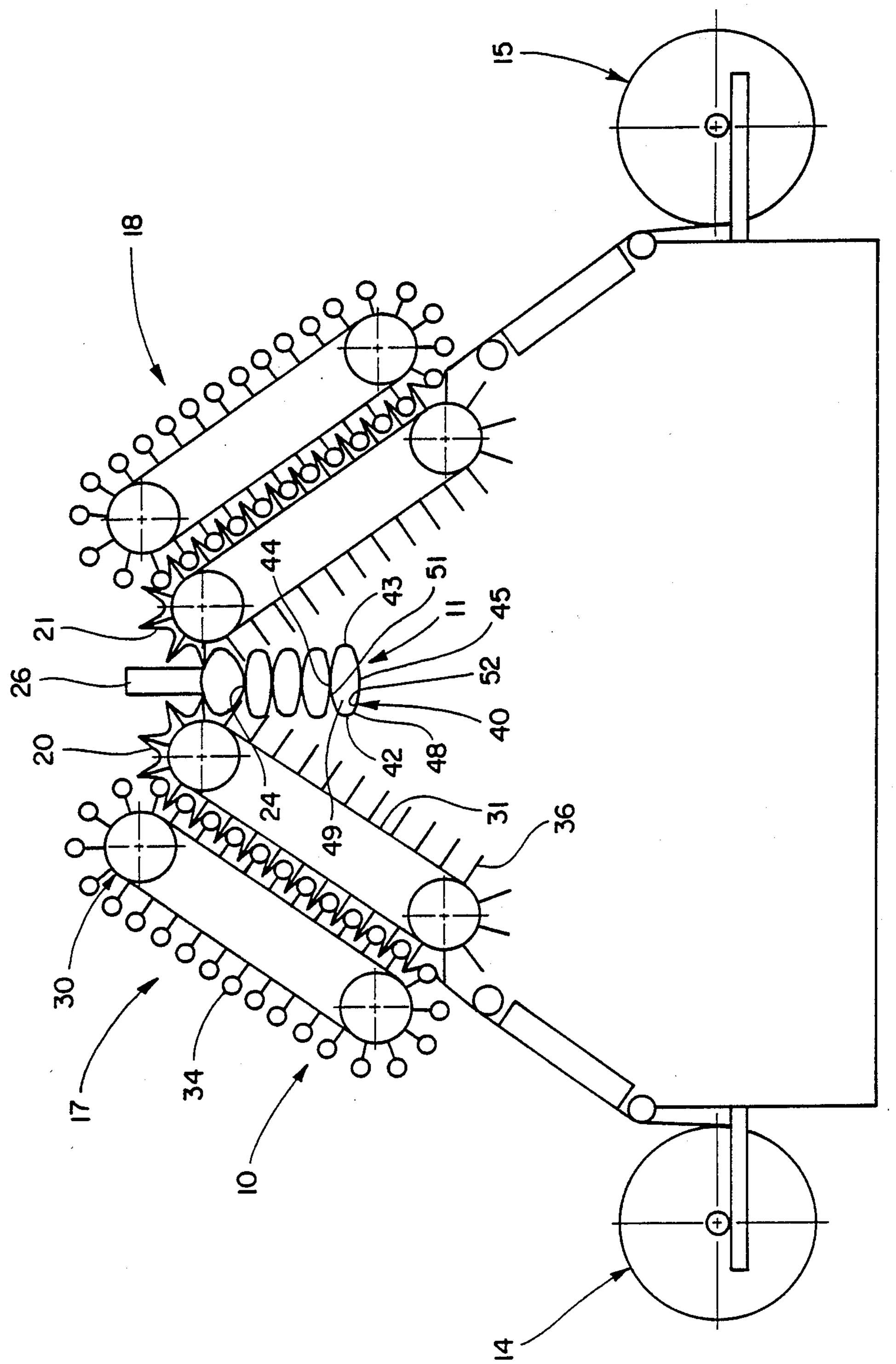
FIG. 1 is a diagramatic side view of a pleating and joining machine according to the present invention.
Figure 2:
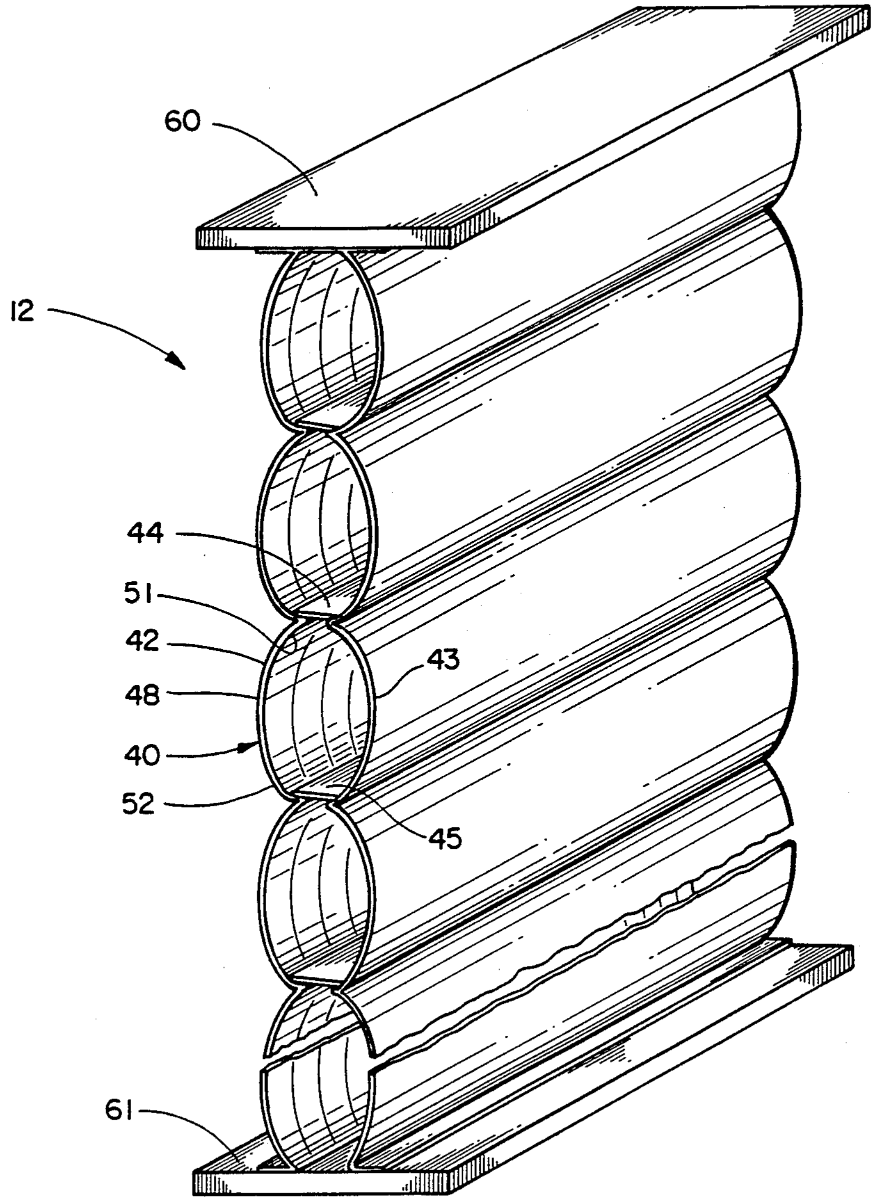
FIG. 2 is a perspective view of a dual fluted shade in the expanded condition produced by the machine illustrated in FIG. 1.

Referring to the drawings and particularly FIG. 1, a pleating and joining machine 10 is illustrated according to the present invention that produces a deep arcuate fluted shade composite illustrated at 11 in FIG. 1 in partly completed form and as a completed shade 12 as illustrated in FIG. 2.

The machine 10 includes a pair of web flexible fabric material rollers 14 and 15 that respectively feed material to a pair of pleating and forming conveyors 17 and 18 that produce pleated webs 20 and 21 that are joined together by parallel joining strips 24 by a sealing device 26 positioned between the conveyors 17 and 18.

The conveyors 17 and 18 each consist of a pair of cooperating endless chain conveyors 30 and 31 with the upper conveyors 31 carrying a plurality of annular tube-like forming bars 34 that cooperate with a plurality of staggered pointed forming racks 36 carried by lower conveyors 31.

The cooperation of the forming bars 34 and the forming racks 36 form the deep flutes in each of the material webs 20 and 21.

The resulting cellular structure illustrated at 11 in FIG. 1 includes a plurality of cells 40 defined by first and second flutes 42 and 43 and top and bottom strips 44 and 45. Each of the flutes 42 and 43 consists of a large radius arcuate portion 48 having an axis 49 and substantially parallel flat leg portions 51 and 52 to which strips 44 and 45 are directly connected. Note that in the composite 11 illustrated in FIG. 1 that strip 44 is connected to the legs of the flutes in the cell immediately above cell 40.

An important aspect of the present invention is that the flutes are deeply formed to provide superior insulating characteristics and toward that end in its as formed condition illustrated in FIG. 1, the axes 49 of the arcuate portions 48 are spaced substantially from one another, although in the completed shade illustrated in FIG. 2, the flutes are not quite as deep when in a fully expanded condition or because of the additional weight of shade end members 60 and 61.

Note, however, that even in the weighted configuration illustrated in FIG. 2, that flutes 42 and 43 each have an arcuate extent of approximately 180 degrees when the shade is in a fully expanded condition.

I claim:

1. An insulating dual fluted shade, comprising: a first one-piece panel and a second parallel one-piece panel each having a plurality of adjacent deep flutes having a large radius peak and leg portions, each of the flutes having an arc greater than 90 degrees, said first and second panels being attached to each other in opposed relation so the flute arcs extend outwardly on both sides to uniformly spread and not concentrate light impinging on the outside of the deep flutes on either panel, the leg portions of adjacent flutes forming sharp points, the points on the first panel being aligned with the points on the second panel, and a connecting strip connecting each of the aligned points on the first and second panels, said strips being directly connected to the first and second panels without any intermediate layers of material, and said first and second panels being sufficiently flexible so that the shade is collapsible in a direction perpendicular to the strips, said flutes being open-ended and non-inflatable.

2. The insulating dual fluted shade as defined in claim 1, wherein the flutes arc is about 180 degrees.

* * * * *